United States Patent
Wachi

(10) Patent No.: US 6,871,968 B2
(45) Date of Patent: Mar. 29, 2005

(54) INSIDE REARVIEW MIRROR APPARATUS FOR MOTOR VEHICLE

(75) Inventor: Kenichi Wachi, Isehara (JP)

(73) Assignee: Ichikoh Industries, Ltd., Tokyo (JP)

(*) Notice: Subject to any disclaimer, the term of this patent is extended or adjusted under 35 U.S.C. 154(b) by 73 days.

(21) Appl. No.: 10/326,270

(22) Filed: Dec. 23, 2002

(65) Prior Publication Data

US 2003/0137757 A1 Jul. 24, 2003

(30) Foreign Application Priority Data

Dec. 26, 2001 (JP) .......................................... 2001-394705

(51) Int. Cl.[7] .............................. B60R 1/04; B60R 1/08; G02B 7/182; G02B 7/198
(52) U.S. Cl. ........................ 359/606; 359/604; 359/872; 359/900; 248/481
(58) Field of Search ................................. 359/603, 604, 359/605, 606, 850, 872, 881, 900; 248/481, 484

(56) References Cited

U.S. PATENT DOCUMENTS 3,918,799 A * 11/1975 Kurz et al. ................. 359/871
4,826,289 A    5/1989 Vandenbrink et al.
4,836,648 A    6/1989 Niwayama
5,016,979 A    5/1991 Yoshino

FOREIGN PATENT DOCUMENTS

| EP | 0 531 686 A1 | * | 3/1993 |
| GB | 1227736 | * | 4/1971 |
| GB | 1 587 645 | | 4/1981 |
| JP | 05-338493 A | * | 12/1993 |
| JP | 10-086749 A | | 4/1998 |
| JP | 11-208373 A | | 8/1999 |

* cited by examiner

Primary Examiner—John Juba, Jr.
(74) Attorney, Agent, or Firm—Foley & Lardner LLP

(57) ABSTRACT

Shafts are respectively provided in a bracket. An operating lever, and bearings and guiding and temporary holding sections are provided in a mirror housing. When the bracket, the mirror housing, and the operating lever are assembled, the shafts are guided to the bearings by the guiding and temporary holding sections, and the shafts are temporarily held in the guiding and temporary holding sections and the bearings. Therefore, the shafts can be rotatably supported on the bearings easily and reliably, and hence the cost of the inside mirror can be reduced.

11 Claims, 8 Drawing Sheets

INSIDE REARVIEW MIRROR APPARATUS FOR MOTOR VEHICLE

BACKGROUND OF THE INVENTION

1) Field of the Invention

The present invention relates to an inside rearview mirror apparatus for a motor vehicle equipped in a vehicle compartment (hereinafter "inside mirror").

2) Description of the Related Art

In this specification, "back" stands for an opposite direction to the running direction of the vehicle, and the back as seen from a driver. Further, "front" stands for the running direction of the vehicle, and the front side as seen from a driver.

As this type of inside mirror, for example, there can be mentioned one described in U.S. Pat. No. 4,836,648 and U.S. Pat. No. 5,016,979. The inside mirror described in these publications is explained below.

The inside mirror has a bracket (22, 5) supported by a stay (7, 1), a mirror housing (3, 10) tiltably supported by the bracket (22, 5) via a first shaft mechanism (22a, 15a, 5f, 10f) and having a prismatic mirror body (9, M), and an operating lever (34, 12) tiltably supported by the mirror housing (3, 10) via a second shaft mechanism (40, 17a, 12c, 10g) and also supported by the bracket (22, 5) so as to be able to be shifted between a first position and a second position via a resilient engagement unit (46, 14). In this inside mirror, the operating lever (34, 12) is shifted to the first position or to the second position. The mirror housing (3, 10) then tilts to the first tilt position or to the second tilt position with respect to the bracket (22, 5) and the stay (7, 1). Thereby, light reflected on the back reflection film of the prismatic mirror (9, M), having a high reflectance for the daytime, enters into the driver's eyes, or light reflected on the surface of the prismatic mirror (9, M), having a low reflectance for the nighttime, enters into the driver's eyes. As a result, glare of the irradiation light from the headlamps of a motor vehicle running behind in the nighttime can be prevented, and hence contributing to safe driving in the nighttime.

However, in the conventional inside mirror, the first shaft mechanism and the second shaft mechanism are simply composed of shafts (22a, 40, 5f, 12c) and bearings (15a, 17a, 10f, 10g). Therefore, in the conventional inside mirror, it is necessary to temporarily hold the bracket (22, 5), the mirror housing (3, 10), and the operating lever (34, 12) by some means, at the time of assembly of the bracket (22, 5), the mirror housing (3, 10), and the operating lever (34, 12). Hence, there is a problem in the assembly process.

SUMMARY OF THE INVENTION

According to the present invention, the first shaft mechanism and the second shaft mechanism respectively comprise, shafts provided in either on the mirror housing side or on the bracket and operating lever side, bearings provided on the other side for rotatably supporting the shafts, and guiding and temporary holding sections provided integrally with the bearings, for rotatably supporting the shaft on the bearing.

Thus, when the bracket, the mirror housing, and the operating lever are assembled, the shaft is guided to the bearing by the guiding and temporary holding section, and temporarily held by the guiding and temporary holding section and the bearing. As a result, in this invention, the shaft can be rotatably supported by the bearing easily and reliably, without requiring any other unit, thereby the cost of the inside mirror can be reduced.

These and other objects, features and advantages of the present invention are specifically set forth in or will become apparent from the following detailed descriptions of the invention when read in conjunction with the accompanying drawings.

DETAILED DESCRIPTIONS

Figure 1:
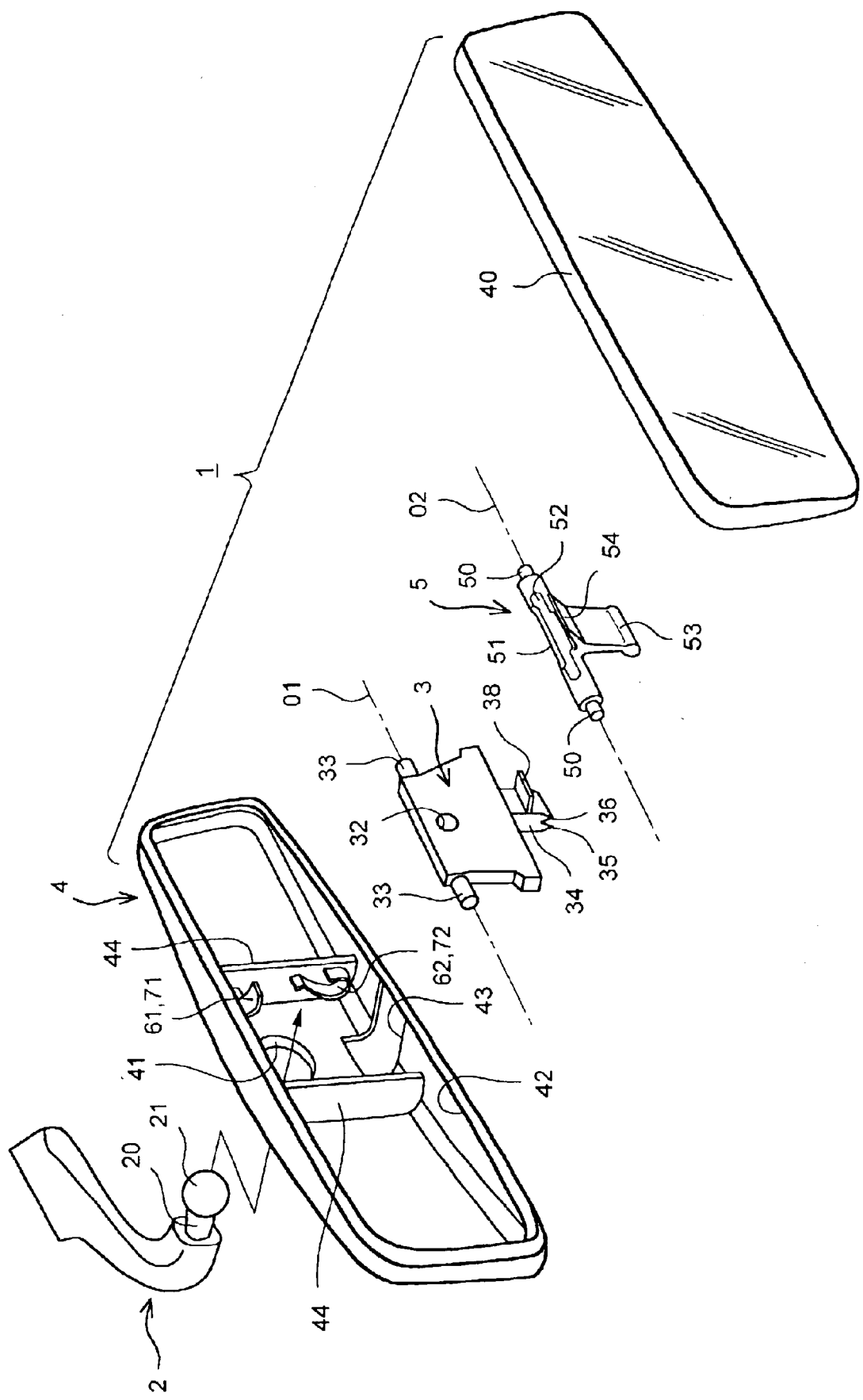
FIG. 1 is an exploded perspective view that shows one embodiment of an inside mirror according to the present invention.

Exemplary embodiment(s) of the inside mirror according to the present invention is explained, with reference to the accompanying drawings. The present invention is by no means limited by this embodiment. In the figures, F shows forward, and B shows backward, and one-dot chain line of F-B shows back and forth horizontal line, when the inside mirror is equipped in the vehicle compartment.

The configuration of the inside mirror according to this embodiment is explained first.

In the FIGS. 1 to 8, reference numeral 1 denotes the inside mirror according to this embodiment. This inside mirror 1 is an anti-glare inside mirror equipped in the vehicle compartment via a stay. The inside mirror 1 comprises a bracket 3, a mirror housing 4 having a prismatic mirror 40, and an operating lever 5.

The stay 2 is formed of, for example, a synthetic resin. This stay 2 is formed, as shown in FIG. 1, substantially in an L shape, from one end to the other end. The one end of the stay 2 is detachably mounted to a mounting point (not shown) in the vehicle compartment, for example, to a front inside roof panel or the inside of a front window panel, by a fitting unit (not shown) having a detachable mechanism (not shown). A shaft 20 having a round bar shape and a ball portion 21 are integrally provided at the other end of the stay 2.

Figure 2:
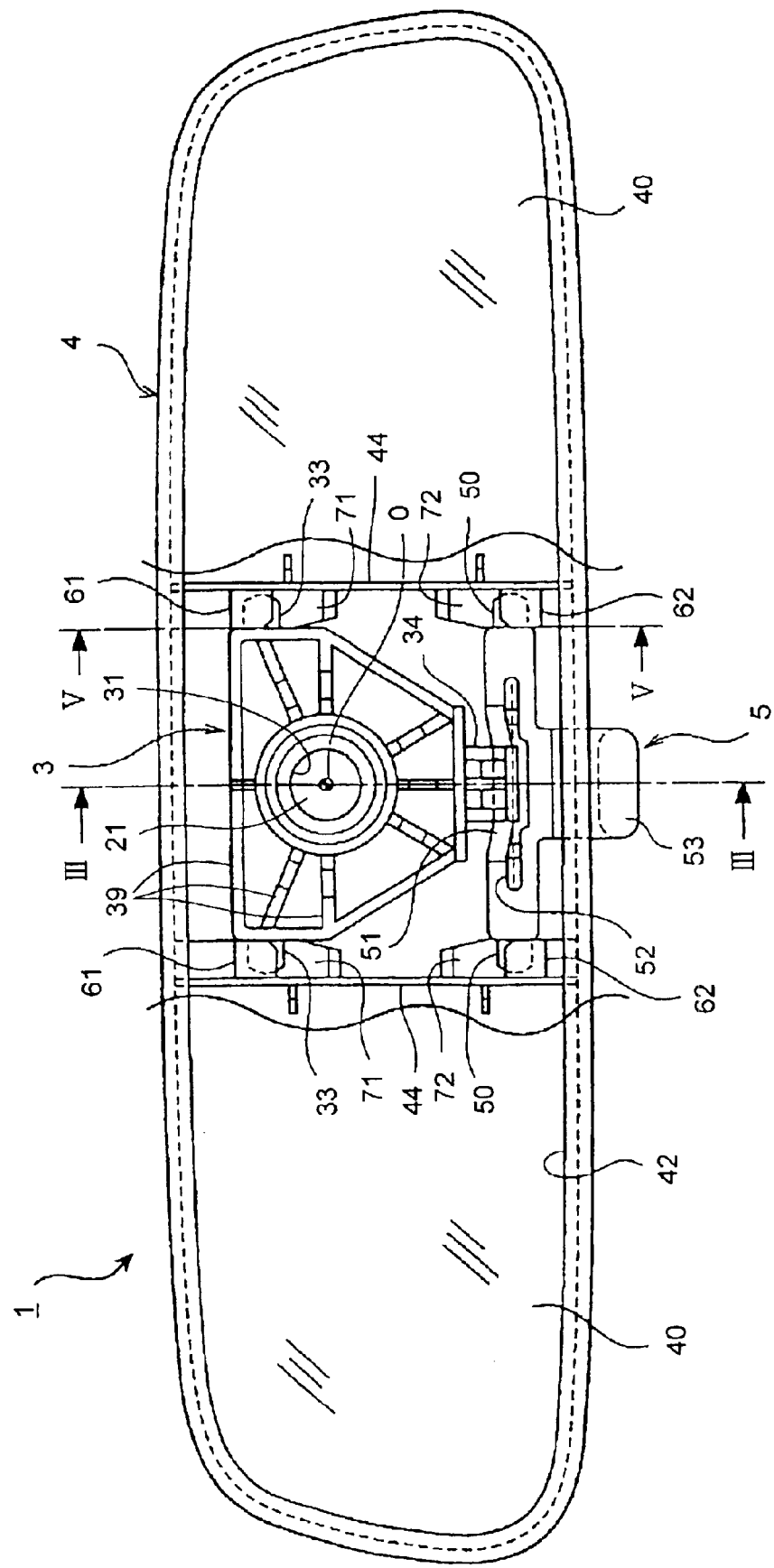
FIG. 2 is a front elevation that shows the main part, with a part of the inside mirror being broken.
Figure 3:
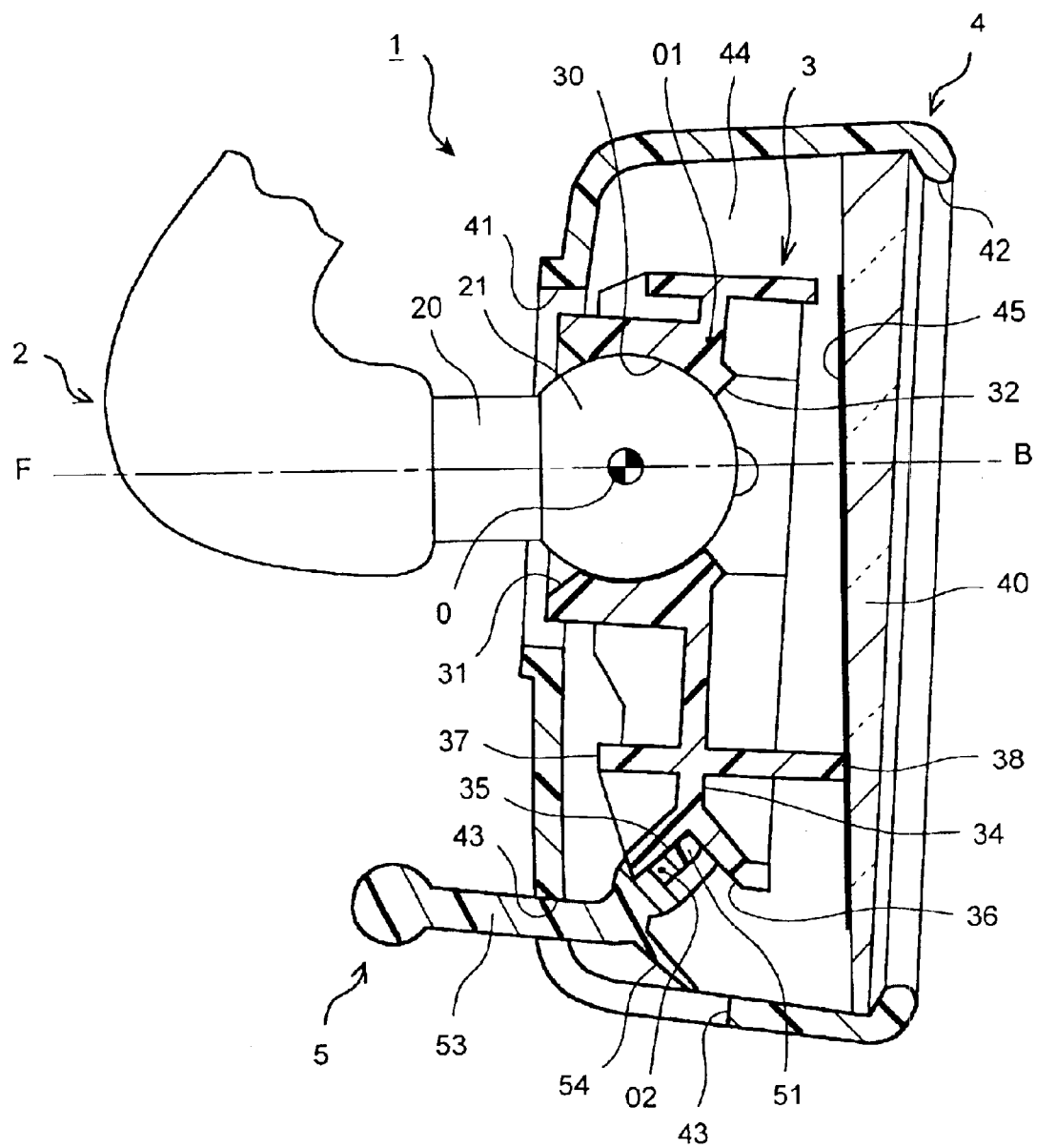
FIG. 3 is a sectional view along the line III—III in FIG. 2, that shows a shifted state for the daytime.
Figure 4:
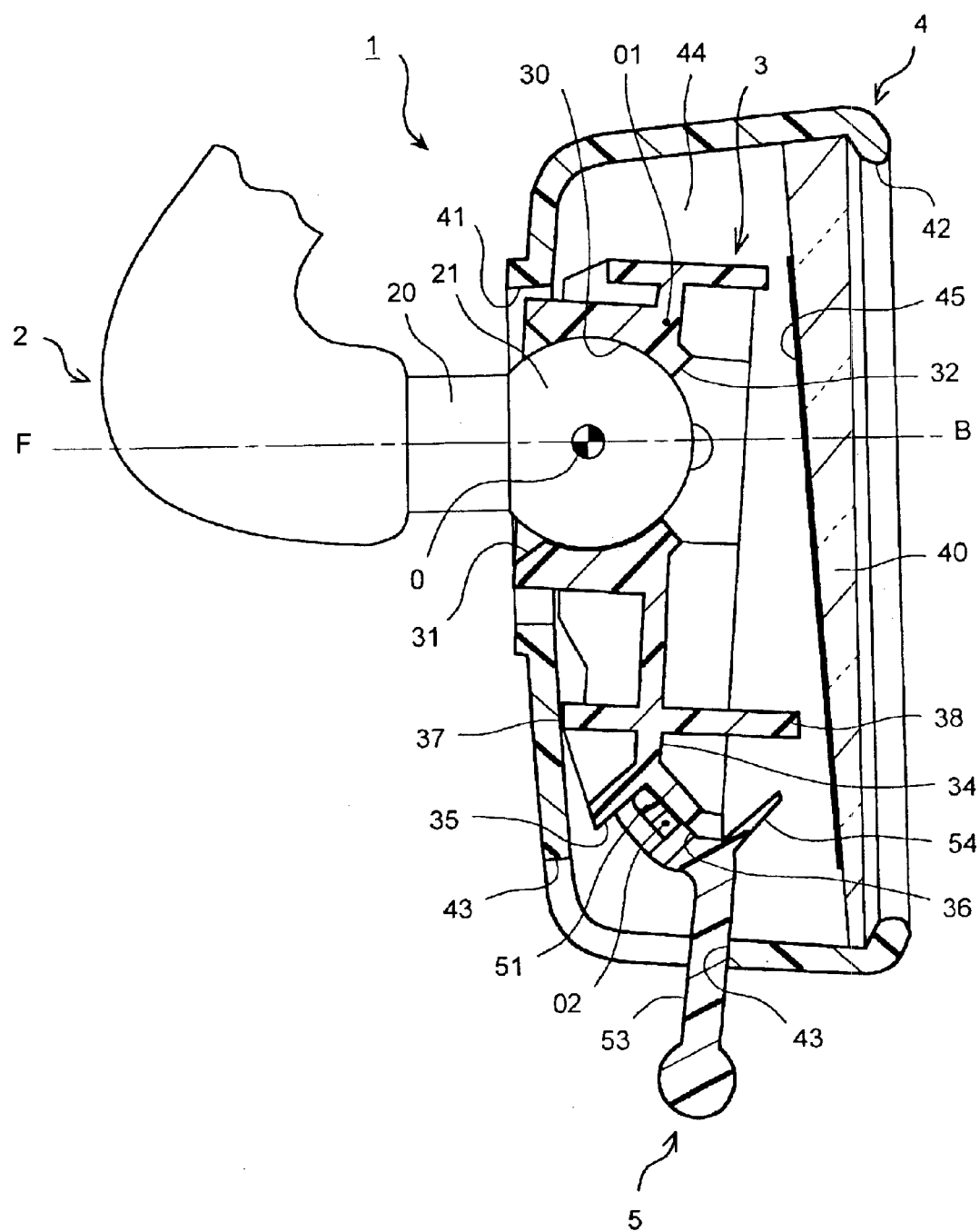
FIG. 4 is a sectional view along the line III—III in FIG. 2, that shows a shifted state for the nighttime.
Figure 6:
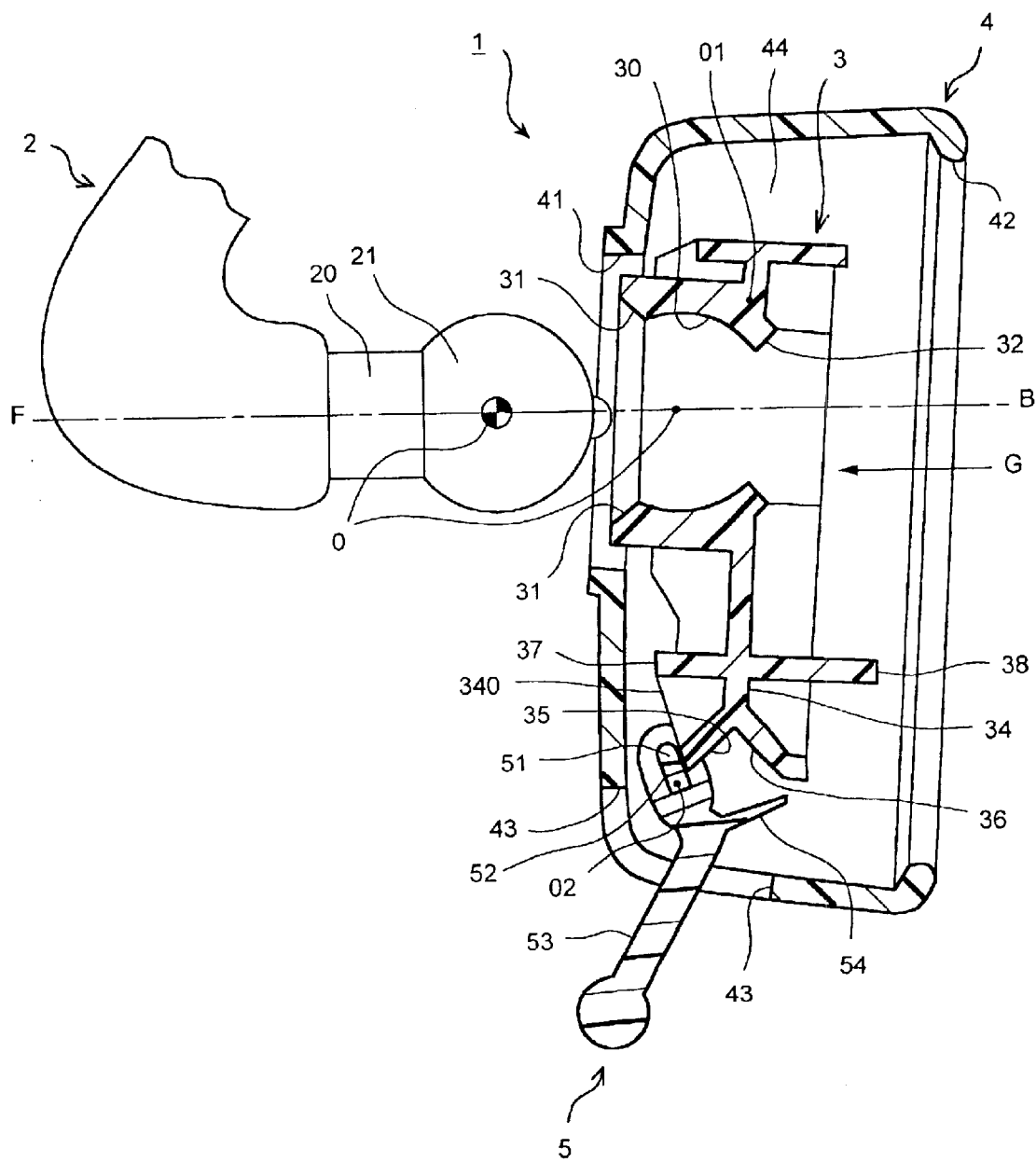
FIG. 6 is a sectional view that shows the assembled state.

The bracket 3 is formed of, for example, a synthetic resin such as PP (polypropylene). The bracket 3 is, as shown in FIG. 1 and FIG. 2, a substantially quadrangular shape in front view. As shown in FIGS. 3, 4, and 6, a first opening 31, a spherical concave portion 30, and a second opening 32 are provided substantially in the intermediate of the upper part of the bracket 3, from the front F side towards the back B side. Cylindrical first shafts 33 are respectively provided integrally on the upper part of the right and left opposite ends of the bracket 3. Further, a plurality of reinforcing ribs 39 is respectively provided integrally on the front and rear faces of the bracket 3, radially from the center O of the spherical concave portion 30, and in an annular shape around the bracket 3.

A convex portion 34 is also provided integrally in the intermediate of the lower end face of the bracket 3. A first abutting face 35 and a second abutting face 36, formed in a V shape, are respectively formed on the lower end face of the convex portion 34. Protrusions 37 and 38 for restricting the shift angle are respectively provided integrally on the front and rear faces of the convex portion 34. Further, the face 340 on the backside of the convex portion 34 inclines.

The mirror housing 4 is formed of, for example, a synthetic resin such as PP (polypropylene). The mirror housing 4 has a hollow housing shape, with the front F being closed and the back B being opened. A circular stay insertion hole 41 is provided substantially at the center on the front side of the mirror housing 4. On the other hand, a mirror opening 42 substantially of a rectangular shape is formed on the backside of the mirror housing 4. A square knob insertion hole 43 is further provided substantially in the middle of from the lower part on the front side to the bottom of the mirror housing 4. Two ribs 44 are provided integrally inside of the mirror housing 4, from the upper wall through the front closed wall towards the bottom wall. The two ribs 44 are provided perpendicularly on the opposite sides of the stay insertion hole 41 and the operating lever insertion hole 43.

The prismatic mirror 40 is formed of, for example, glass. The prismatic mirror 44 has a surface and a back face, not parallel but slightly inclined. A reflection film is applied on the back face of the prismatic mirror 40 by aluminum evaporation, silver painting or the like (not shown), and a tape 45 made of Kraft paper (shown by a thick line in FIG. 3 to FIG. 5) is provided. This prismatic mirror 40 is fitted and fixed to the edge of the mirror opening 42 of the mirror housing 4.

The operating lever 5 is formed of, for example, a synthetic resin such as POM (Polyoxymethylene). As shown in FIG. 1 and FIG. 2, the operating lever 5 forms substantially a T shape as seen from the front. Cylindrical second shafts 50 are respectively provided integrally on the right and left opposite ends on the upper part of the operating lever 5. A resilient engagement abutting portion 51 is provided integrally in the middle on the upper part of the operating lever 5. In other words, resilience is given to the resilient engagement abutting portion 51, by providing a slit 52 in the middle on the upper part of the operating lever 5. As a result, the resilient engagement abutting portion 51 has flexibility. If the thickness of the resilient engagement abutting portion 51 is made thinner than that of other parts, the flexibility thereof increases. The resilient engagement abutting portion 51, the first abutting face 35 and the second abutting face 36 constitute a resilient engagement unit.

Figure 5:
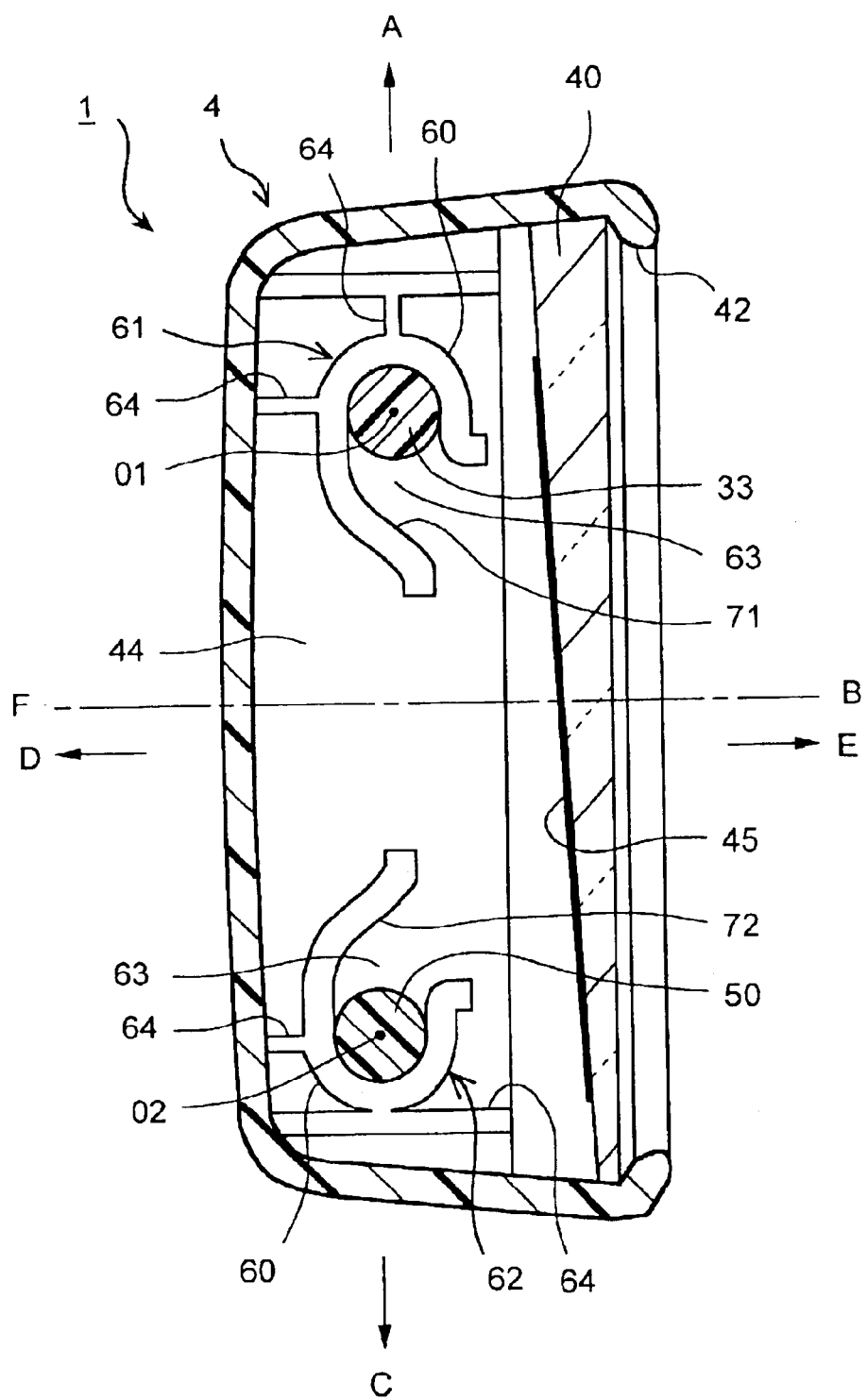
FIG. 5 is a sectional view along the line V—V in FIG. 2.

The resilient engagement abutting portion 51 of the resilient engagement unit resiliently engages with a trough between the first abutting face 35 and the second abutting face 36, thereby the resilience in the direction of an arrow A and in the direction of an arrow C in FIG. 5 respectively acts on the bracket 3 and the operating lever 5, respectively. When the operating lever 5 is shifted to the first position (a position with the state shown in FIG. 3) or the second position (a position with the state shown in FIG. 4), the resilient engagement abutting portion 51 of the resilient engagement unit resiliently abuts on the first abutting face 35 or the second abutting face 36, before the operating lever 5 abuts on the edge of the operating lever insertion hole 43.

Further, a knob 53 is integrally provided at the lower part of the operating lever 5. A cover plate 54 that covers the operating lever insertion hole 43, is integrally provided on the face on the backside of the knob 53. The cover plate may be provided on the face on the front side of the knob 53, or on the both faces front and back of the knob 53.

First bearings 61, second bearings 62, first guiding and temporary holding sections 71 and second guiding and temporary holding sections 72 are respectively provided, on the faces of the two ribs 44 of the mirror housing 4, facing each other.

The first bearings 61 and the second bearings 62 are formed, as shown in FIG. 5, substantially in an inverse U shape and a U shape. In other words, the first bearings 61 and the second bearings 62 have walls 60 and openings 63. Those walls 60 rotatably support the first shafts 33 and the second shafts 50, respectively, in the direction in which the resilience of the resilient engagement unit acts on the bracket 3 and the operating lever 5 (in the directions of an arrow A and an arrow C in FIG. 5), and in the direction in which the mirror housing 4 and the operating lever 5 respectively tilt with respect to the bracket 3 (in the directions of an arrow D and an arrow E in FIG. 5). The openings 63 are for supporting the first shafts 33 and the second shafts 50 on the walls 60 in the directions other than the above directions.

The first guiding and temporary holding sections 71 and the second guiding and temporary holding sections 72 are integrally extended, as shown in FIG. 5, from the edge of the walls 60 on the openings 63 side in the direction of assembling the bracket 3 and the operating lever 5 via the resilient engagement unit (in the direction of an arrow G in FIG. 6, that is, in the direction of the arrow D in FIG. 5). The extending directions of the first guiding and temporary holding sections 71 and the second guiding and temporary holding sections 72 are directions between the direction opposite to the resilience acting direction and the direction opposite to the assembly direction, and in this example, in directions inclined by about 50° with respect to the vertical portions of the walls 60. In FIG. 5, reference numeral 64 denotes a rib.

When assembling the inside mirror 1, first, the second shafts 50 of the operating lever 5 are set in the second bearings 62 in the mirror housing 4, via the second guiding and temporary holding sections 72. At this time, the second shafts 50 are guided to the second bearings 62 by the second guiding and temporary holding sections 72, and the second shafts 50 are temporarily held in the second guiding and temporary holding sections 72 and the second bearings 62. In other words, the second shafts 50 are temporarily held on the walls 60 through the openings 63 of the second bearings 62. The knob 52 of the operating lever 5 is also inserted from the operating lever insertion hole 43 in the mirror housing 4 towards outside.

The first shafts 33 of the bracket 3 are then set in the first bearings 61 in the mirror housing 4, via the first guiding and temporary holding sections 71. At this time, the first shafts 33 are guided to the first bearings 61 by the first guiding and temporary holding sections 71, and the first shafts 33 are temporarily held in the first guiding and temporary holding sections 71 and the first bearings 61. In other words, the first shafts 33 are temporarily held on the walls 60 through the openings 63 of the first bearings 61. The slant face 340 of the bracket 3 is abutted against the resilient engagement abutting portion 51 of the operating lever 5. Further, the first opening 31 of the bracket 3 is made to face the stay insertion hole 41 in the mirror housing 4.

The temporary assembling process of the mirror housing 4 and the operating lever 5, and the temporary assembling process of the mirror housing 4 and the bracket 3 may be carried out the other way around.

The stay 2 is set to a jig (not shown). The stay insertion hole 41 in the mirror housing 4 temporarily assembled on the ball portion 21 of the stay 2 is made to face the first opening 31 in the bracket 3.

The first opening 31 and the spherical concave portion 30 in the bracket 3 are press-fitted to the ball portion 21 of the stay 2. The ball portion 21 of the stay 2 then passes through the stay insertion hole 41 in the mirror housing 4, and is press-fitted to the spherical concave portion 30 of the bracket 3, thereby the ball portion 21 and the spherical concave portion 30 are tiltably connected to each other by a fit structure (interference fit structure). As a result, the bracket 3 is tiltably supported by the stay 2.

The first shafts 33 of the bracket 3 are rotatably supported by the first bearings 61 in the mirror housing 4. As a result, the mirror housing 4 having the prismatic mirror 40 is tiltably supported by the bracket 3. On the other hand, the second shafts 50 of the operating lever 5 are rotatably supported by the second bearings 62 in the mirror housing 4. As a result, the operating lever 5 is tiltably supported by the mirror housing 4. The first shafts 33 and the first bearings 61 (and the first guiding and temporary holding sections 71) constitute a first shaft mechanism. On the other hand, the second shafts 50 and the second bearings 62 (and the second guiding and temporary holding sections 72) constitute a second shaft mechanism.

Further, the resilient engagement abutting portion 51 of the operating lever 5 is deflect to resiliently engage with the trough between the first abutting face 35 and the second abutting face 36 of the bracket 3. As a result, the operating lever 5 is supported by the bracket 3 via the resilient engagement unit, so as to be able to be shifted to the first position or the second position.

The action and effects of the inside mirror 1 are as follows. In the state shown in FIG. 3 and in the state shown by a solid line in FIG. 7, the resilient engagement abutting portion 51 of the operating lever 5 resiliently abuts on the first abutting face 35 of the bracket 3, and the operating lever 5 is located in the first position. The protrusion 38 on the backside of the bracket 3 abuts on the prismatic mirror 40, and the mirror housing 4 is located in the first tilt position. In this state, the light entering into the prismatic mirror 40 (not shown) is reflected at a high reflectance on the reflection film on the rear face of the prismatic mirror 40. The reflected light enters into the driver's eyes, and hence the driver can visually check the back in the daytime.

Figure 7:
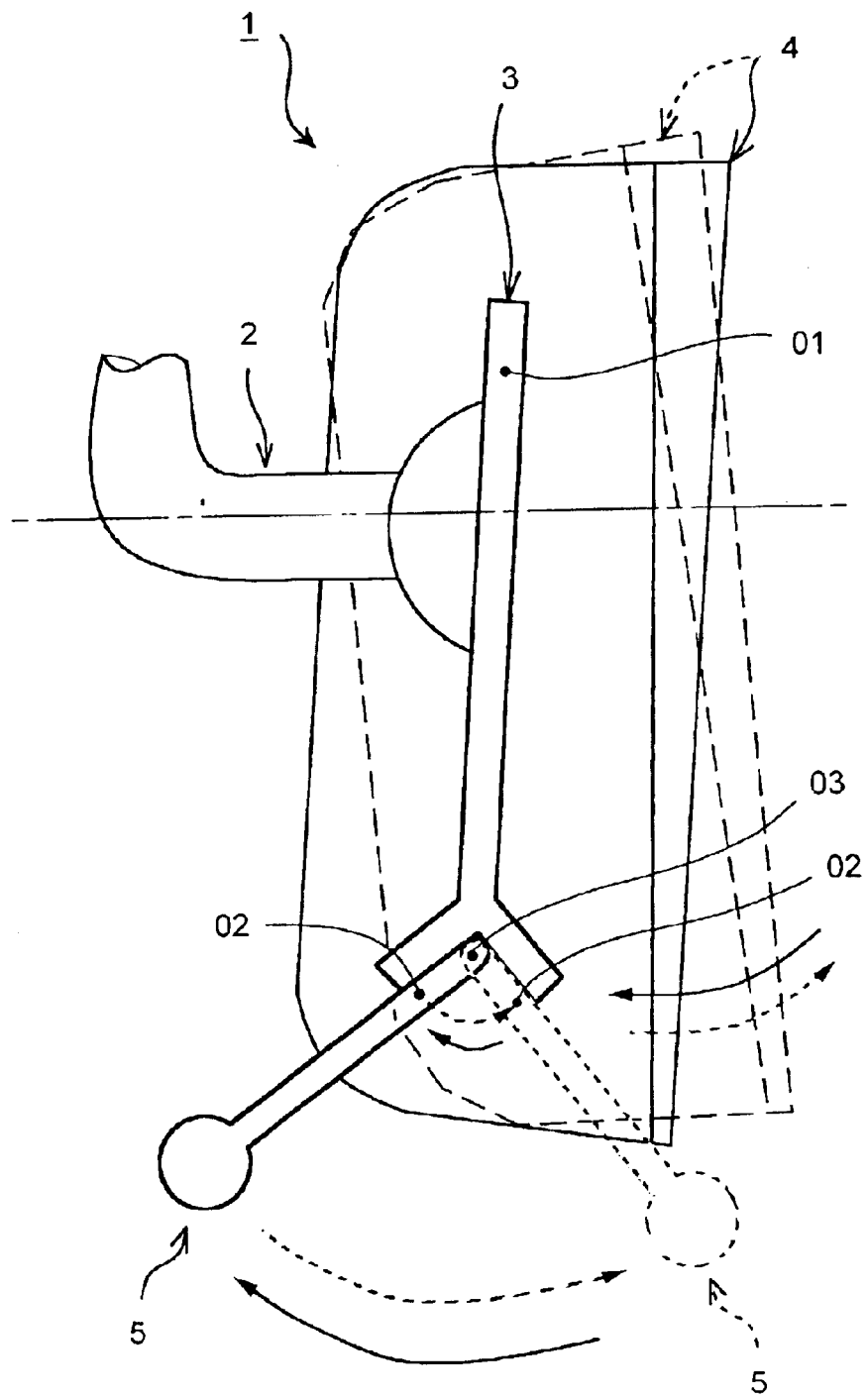
FIG. 7 shows the shifted states for the daytime and the nighttime.

The operating lever 5 is tilted in a direction of an arrow of a dashed line in FIG. 7. The operating lever 5 then tilts in the direction of the dashed arrow, about a fulcrum O3 of the resilient engagement unit. Accompanying this tilt of the operating lever 5, the mirror housing 4 connected to the operating lever 5 via the second shaft mechanism is tilted in the direction of the dashed arrow about the axis O1 of the first shaft mechanism. At this time, the angle of inclination of the operating lever 5 about the fulcrum O3 of the resilient engagement unit, and the angle of inclination of the mirror housing 4 about the axis O1 of the first shaft mechanism are different from each other. However, since the second shafts 50 of the second shaft mechanism that connect the operating lever 5 and the mirror housing 4, and the second bearings 62 rotate to each other about the axis O2, the operating lever 5 and the mirror housing 4 can smoothly tilt, respectively.

When the operating lever 5 is shifted from the state shown in FIG. 3 and the state shown by the solid line in FIG. 7 to the state shown in FIG. 4 and the state shown by the dashed line in FIG. 7, the resilient engagement abutting portion 51 of the operating lever 5 resiliently abuts on the second abutting face 36 of the bracket 3, so that the operating lever 5 is located in the second position. At the same time, the protrusion 37 on the front side of the bracket 3 abuts on the mirror housing 4, so that the mirror housing 4 is located in a second tilt position. In this state, the light entering into the prismatic mirror 40 (not shown) is reflected at a low reflectance on the surface of the prismatic mirror 40. The reflected light enters into the driver's eyes, and hence the driver can visually check the back in the nighttime. As a result, glare of the irradiation light from the headlamps of a motor vehicle running behind in the nighttime can be prevented, and hence contributing to safe driving in the nighttime.

The operating lever 5 is tilted in the direction of the solid arrow in FIG. 7. The operating lever 5 is then similarly shifted from the state shown in FIG. 4 and the state shown by the dashed line in FIG. 7 to the state shown in FIG. 3 and the state shown by the solid line in FIG. 7, that is, to the first position. On the other hand, the mirror housing 4 is shifted from the state shown in FIG. 4 and the state shown by the dashed line in FIG. 7 to the state shown in FIG. 3 and the state shown by the solid line in FIG. 7, that is, to the first tilt position. As a result, the reflected light having a high reflectance enters into the driver's eyes. In this manner, by shifting the operating lever 5 to the first position or to the second position, the reflected light having a high reflectance for the daytime or the reflected light having a low reflectance for the nighttime can be respectively obtained.

In the inside mirror 1, when the bracket 3, the mirror housing 4, and the operating lever 5 are assembled, the first shafts 33 and the second shafts 50 are guided to the first bearings 61 and the second bearings 62 by the first guiding and temporary holding sections 71 and the second guiding and temporary holding sections 72, respectively, and the first shafts 33 and the second shafts 50 are temporarily held in the first guiding and temporary holding sections 71, the second guiding and temporary holding sections 72, and the first bearings 61, the second bearings 62, respectively. As a result, in this inside mirror 1, the first shafts 33 and the second shafts 50 can be rotatably supported by the first bearings 61 and the second bearings 62 easily and reliably, without requiring any other unit, and hence, the cost of the inside mirror can be reduced.

In this inside mirror 1, the first bearings 61 and the second bearings 62 in the mirror housing have walls 60 and openings 63, as shown in FIG. 5, substantially in an inverse U-shape and in a U-shape, and the first bearings 61 and the second bearings 62 are rotatably supported, respectively, on the walls 60 through the openings 63. Therefore, at the time of shifting the operating lever 5, a shifting operation force respectively acts on the first shafts 33 and the second shafts 50. However, since there are walls 60 in the direction to which the shifting operating lever force acts, the first shafts 33 and the second shafts 50 do not come out of the walls 60 of the first bearings 61 and the second bearings 62. As a result, in this inside mirror, it is not necessary to press fit or insert by force the first shafts 33 and the second shafts 50 into the first bearings 61 and the second bearings 62. Hence, there is no possibility of deformation of members due to the press-fit or insertion by force, and the engagement between the shafts and the bearings can be performed easily, even in a relatively cold season when the members are hardly deflect, such as in winter.

In the inside mirror 1, two ribs 44 are integrally provided inside of the mirror housing 4, from the upper wall through the front closed wall to the bottom wall, and the first bearings 61, the second bearings 62, the first guiding and temporary holding sections 71, and the second guiding and temporary holding sections 72 are respectively provided, on the faces of the two ribs 44 facing each other. As a result, in this inside mirror 1, even when sink mark occurs in the ribs 44 due to the first bearings 61, the second bearings 62, the first guiding and temporary holding sections 71 and the second guiding and temporary holding sections 72, no sink mark occurs on the surface of the front closed wall of the mirror housing 4, and hence there is no problem in the appearance. Further, even when the thickness of the first bearings 61, the second bearings 62, the first guiding and temporary holding sections 71 and the second guiding and temporary holding sections 72 are made thick in order to increase the strength, there is no problem in the appearance due to the sink mark.

In the inside mirror 1, when the operating lever 5 is shifted to the first position or to the second position, the resilient engagement abutting portion 51 of the operating lever 5 resiliently abuts on the first abutting face 35 or the second abutting face 36 of the bracket 3, before the operating lever 5 abuts on the edge of the operating lever insertion hole 43 in the mirror housing 4, or before the protrusions 37 and 38 of the bracket 3 abut on the mirror housing 4 and the prismatic mirror 40. Therefore, this inside mirror 1 can decrease the noise at the time of shifting the operating lever 5.

In the inside mirror 1, since the cover plate 54 is provided on the operating lever 5, as shown in FIG. 3, when the operating lever 5 is located in the first position, the cover plate 54 covers the operating lever insertion hole 43 in the mirror housing 4. As a result, in this inside mirror 1, the cover plate 54 covers up so that the inside of the mirror housing 4 cannot be seen through the operating lever insertion hole 43, and hence the appearance is improved.

In the inside mirror 1, since the ball portion 21 of the stay 2 and the spherical concave portion 30 of the bracket 3 are tiltably connected to each other by the fit structure, the number of parts decreases, and the assembly becomes easy.

In the inside mirror 1, the direction of assembling the shafts 33 and 50 with the bearings 61 and 62 via the guiding and temporary holding sections 71 and 72, the direction of assembling the trough between the first abutting face 35 and the second abutting face 36 of the bracket 3 with the resilient engagement abutting portion 51 of the operating lever 5 via the resilient engagement unit, and the direction of assembling the spherical concave portion 30 of the bracket 3 with the ball portion 21 of the stay 2 substantially agree with the direction of an arrow G in FIG. 6. As a result, in this inside mirror 1, the assembly of the shafts 33 and 50 with the bearings 61 and 62, the assembly of the bracket 3 and the operating lever 5, and the assembly of the bracket 3 and the stay 2 can be carried out simultaneously, by one press-fit process.

Figure 8:
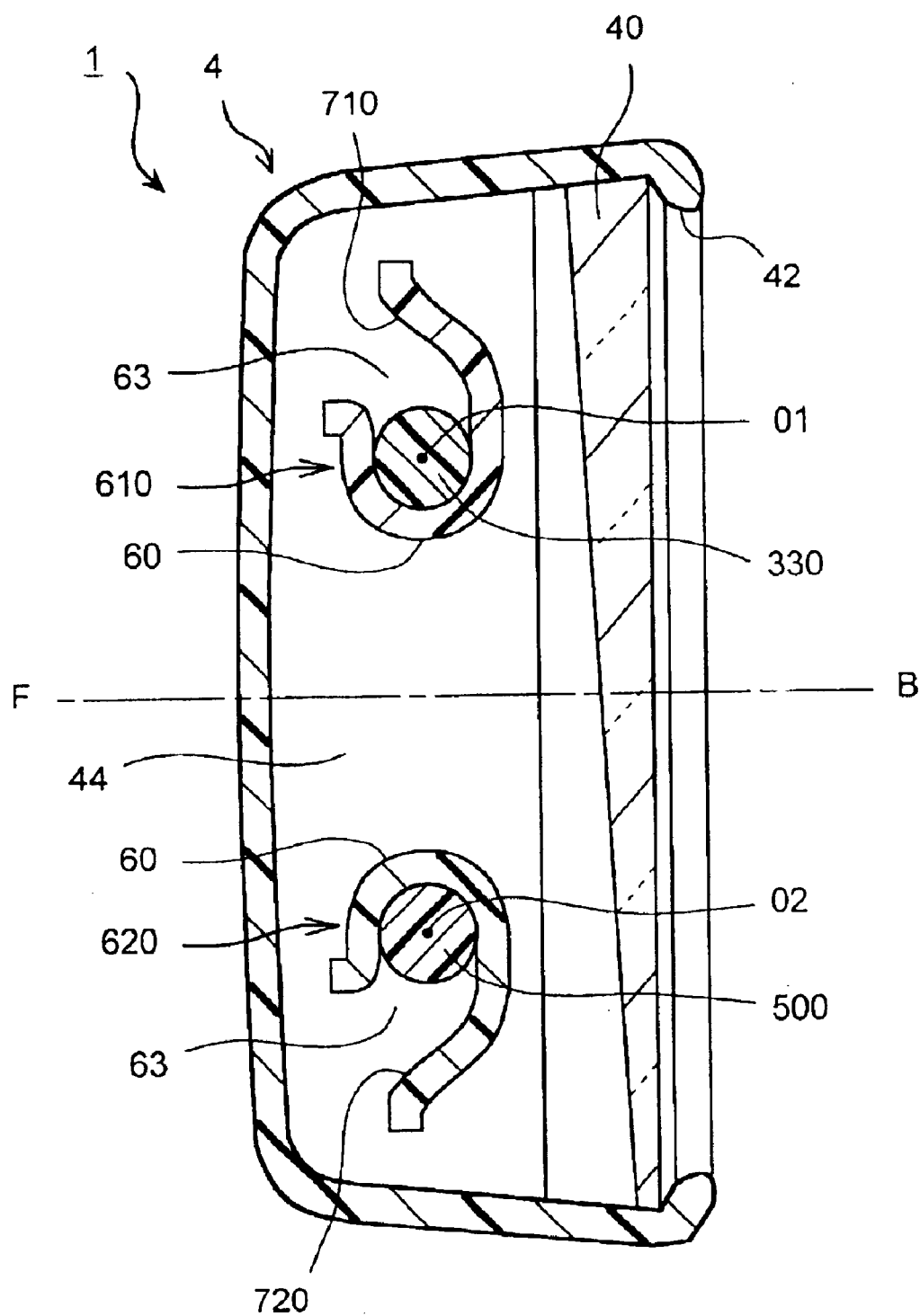
FIG. 8 is a sectional view that shows a modified example of a first shaft mechanism and a second shaft mechanism.

FIG. 8 is a longitudinal section that shows a modified example of the first shaft mechanism and the second shaft mechanism. In the figure, the same reference numerals as in FIG. 1 to FIG. 7 denote the same members.

First shafts 330 and second shafts 500 formed in a cylindrical shape are respectively provided on the faces of two ribs 44 in the mirror housing 4, facing each other. First bearings 610 and first guiding and temporary holding sections 710 are respectively provided on the opposite sides of the bracket. Second bearings 620 and second guiding and temporary holding sections 720 are respectively provided on the opposite sides of the bracket.

The first bearings 610 and the second bearings 620 are formed substantially in a U-shape and in an inverse U-shape. In other words, the first bearings 610 and the second bearings 620 have walls 600 and openings 630. Those walls 600 rotatably support the first shafts 330 and the second shafts 500, respectively, in the direction opposite to the direction in which the resilience of the resilient engagement unit acts on the bracket 3 and the operating lever 5, and in the direction in which the mirror housing 4 and the operating lever 5 respectively tilt with respect to the bracket 3. The openings 630 are for supporting the first shafts 330 and the second shafts 500 on the walls 600 in the directions other than the above directions.

The first guiding and temporary holding sections 710 and the second guiding and temporary holding sections 720 are integrally extended from the edge of the walls 600 on the openings 630 side in the direction opposite to the direction in which the bracket 3 and the operating lever 5 are assembled via the resilient engagement unit. The extending directions of the first guiding and temporary holding sections 710 and the second guiding and temporary holding sections 720 are directions between the resilience acting direction and the assembly direction, and in this example, in directions inclined by about 50° with respect to the vertical portions of the walls 600.

The first shaft mechanism and the second shaft mechanism in this modified example can achieve the same action and effects as those of the first embodiment.

In this embodiment the first shaft mechanism and the second shaft mechanism are provided on the ribs 44 in the mirror housing 4. As another embodiment, however, the first shaft mechanism and the second shaft mechanism may be provided directly in the mirror housing 4.

In this embodiment, the first abutting face 35 and the second abutting face 36 are provided in the bracket 3, and the resilient engagement abutting portion 51 is provided in the operating lever 5. As another embodiment, however, the resilient engagement abutting portion may be provided in the bracket 3, and the first abutting face and the second abutting face may be provided on the operating lever 5, in the opposite manner.

In this embodiment, the cover plate 54 for covering the operating lever insertion hole 43 is provided on the operating lever 5. As another embodiment, however, the cover plate may not be provided on the operating lever 5.

In this embodiment, the ball portion 21 of the stay 2 and the spherical concave portion 30 of the bracket 3 are tiltably connected to each other by the fit structure. As another embodiment, however, the configuration may be such that the ball portion 21 of the stay 2 is put between the bracket and other part, without using the fit structure.

In this embodiment, the direction of assembling the shafts 33 and 50 with the bearings 61 and 62, the direction of assembling the bracket 3 and the operating lever 5, and the direction of assembling the bracket 3 and the stay 2 substantially agree with each other. As another embodiment, however, these assembly directions may not agree with each other.

In this embodiment, the ball portion 21 of the stay 2 is connected to the bracket 3, by passing through the stay insertion hole 41 provided on the rear closing wall of the mirror housing 4. As another embodiment, however, the ball portion 21 of the stay 2 may be connected to the bracket, by passing through the stay insertion hole provided on the upper wall of the mirror housing 4.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

This application claims priority from Japanese Patent Application 2001-394705, filed Dec. 26, 2001, which is incorporated herein by reference in its entirety.

What is claimed is:

1. An inside rearview mirror apparatus, for a motor vehicle, equipped in a vehicle compartment via a stay, comprising:

a bracket supported by the stay;

a mirror housing tiltably supported by the bracket via a first shaft mechanism and having a prismatic mirror body; and a lever tiltably supported by the mirror housing via a second shaft mechanism and also supported by the bracket via a resilient engagement unit, so as to be able to be shifted between a first position and a second position, wherein each of the first shaft mechanism and the second shaft mechanism includes:

shafts provided on one of a mirror housing side or a bracket and lever side, bearings provided on the other of the mirror housing side or the bracket and lever side for rotatably supporting the shafts, and the bearings comprising guiding and temporary holding sections configured to temporarily hold the shafts therein while guiding the shafts further into the bearings upon assembly of the apparatus.

2. The mirror apparatus according to claim 1, wherein the shafts are provided on the bracket and lever side, the bearings are provided on the mirror housing side, and respectively have a first wall and a second wall, the first wall supports a respective one of the shafts, in a resilience acting direction in which the resilience of the resilient engagement unit respectively acts on the bracket and the lever and in a direction in which the mirror housing and the lever respectively tilt with respect to the bracket, the second wall has an opening and supports a respective one of the shafts on the first wall in a direction other than the above directions, and the guiding and temporary holding sections are provided on the mirror housing side, and extended in a direction between the direction opposite to the resilience acting direction and the direction opposite to an assembly direction, from the edge of the opening of the second wall in the direction of assembling the bracket and the lever via the resilient engagement unit.

3. The mirror apparatus according to claim 1, wherein the shafts are provided on the mirror housing side, the bearings are provided on the bracket and lever side, and respectively have a first wall and a second wall, the first wall supports a respective one of the shafts, in a direction opposite to a resilience acting direction in which the resilience of the resilient engagement unit respectively acts on the bracket and the lever and in a direction in which the mirror housing and the lever respectively tilt with respect to the bracket, the second wall has an opening and supports a respective one of the shafts on the first wall in a direction other than the above directions, and the guiding and temporary holding sections are provided on the bracket and lever side, and extended in a direction between the resilience acting direction and the assembly direction, from the edge of the opening of the wall in the direction opposite to the direction of assembling the bracket and the lever via the resilient engagement unit.

4. The mirror apparatus according to claim 1, wherein two ribs are provided in the mirror housing, and the shafts of the first shaft mechanism and the second shaft mechanism, or the bearings and the guiding and temporary holding sections are provided on the faces of the two ribs facing each other.

5. The mirror apparatus according to claim 1, wherein a lever insertion hole is provided in the mirror housing, and a part of the lever protrudes outwards of the mirror housing through the lever insertion hole, and the resilient engagement unit includes a first abutting face and a second abutting face provided in a V shape on one of the bracket side or the lever side, and a resilient engagement abutting portion provided on the other of the bracket side or the lever side, which resiliently engages with a trough between the first abutting face and the second abutting face, such that when the lever is shifted to the first position or to the second position, the resilient engagement abutting portion resiliently abuts on a respective one of the first abutting face or the second abutting face, before the lever abuts on the edge of the lever insertion hole.

6. The mirror apparatus according to claim 1, wherein a lever insertion hole is provided in the mirror housing, and a part of the lever protrudes outwards of the mirror housing through the lever insertion hole, and a cover plate for covering the lever insertion hole is provided on the lever.

7. The mirror apparatus according to claim 1, wherein a ball portion is provided on the stay, and a spherical concave portion is provided in the bracket, such that the ball portion of the stay and the spherical concave portion in the bracket are tiltably connected to each other by a fit structure.

8. The mirror apparatus according to claim 1, wherein the direction of assembling the shafts of the first shaft mechanism and the second shaft mechanism with the bearings through the guiding and temporary holding sections, the direction of assembling the bracket and the lever via the resilient engagement unit, and the direction of assembling the bracket and the stay substantially agree with each other.

9. An inside rearview mirror apparatus, for a motor vehicle, equipped in a vehicle compartment via a stay, comprising:

a bracket configured to be supported by the stay;

a mirror housing tiltably supported by the bracket via a first shaft mechanism; and a lever tiltably supported by the mirror housing via a second shaft mechanism and also supported by the bracket, capable of being shifted between a first position and a second position, wherein each of the first shaft mechanism and the second shaft mechanism includes:

a shaft provided on one of a mirror housing side or a bracket side;

a bearing provided on the other of the mirror housing side or the bracket side for rotatably supporting the shaft; and the bearing comprising a guiding and temporary holding section configured to temporarily hold the shaft therein while guiding the shaft further into the bearing upon assembly of the apparatus.

10. A method of assembling an inside rearview mirror apparatus, for a motor vehicle, equipped in a vehicle compartment via a stay, the method comprising:

providing a bracket configured to be supported by the stay;
providing a mirror housing;
providing a lever;
wherein the inside rearview apparatus includes a first shaft mechanism and a second shaft mechanism respectively, each shaft mechanism including:
  a shaft provided on one of a mirror housing side or a bracket side;
  a bearing provided on the other of the mirror housing side or the bracket side; and
  a guiding and temporary holding section provided with the bearing;
disposing the shafts on respective ones of the guiding and temporary holding sections so as to temporarily hold the shafts; and
guiding the shafts via respective ones of the guiding and temporary holding sections to respective ones of the bearings, and setting the shafts in the bearings so as to rotatably support the shafts.

11. An inside rearview mirror apparatus, for a motor vehicle, equipped in a vehicle compartment via a stay, comprising:
  a bracket supported by the stay;
  a mirror housing tiltably supported by the bracket via a first shaft mechanism and having a prismatic mirror body; and
  a lever tiltably supported by the mirror housing via a second shaft mechanism and also supported by the bracket via a resilient engagement unit, so as to be able to be shifted between a first position and a second position,
  wherein each of the first shaft mechanism and the second shaft mechanism includes:
  shafts provided on one of a mirror housing side or a bracket and lever side;
  bearings provided on the other of the mirror housing side or the bracket and lever side for rotatably supporting the shafts, and respectively having a first wall and a second wall, wherein
  the first wall supports a respective one of the shafts, in a resilience acting direction in which the resilience of the resilient engagement unit respectively acts on the bracket and the lever and in a direction in which the mirror housing and the lever respectively tilt with respect to the bracket, and
  the second wall has an opening and supports a respective one of the shafts on the first wall in a direction other than the above directions, and
  the bearings comprising guiding and temporary holding sections configured to temporarily hold the shafts therein while guiding the shafts further into the bearings upon assembly of the apparatus, the guiding and temporary holding sections being extended in a direction between the direction opposite to the resilience action direction and the direction opposite to an assembly direction, from the edge of the opening of the second wall in the direction of assembling the bracket and the lever via the resilient engagement unit.

* * * * *